Jan. 2, 1923.

L. E. ANDERSON.
CLUTCH.
FILED JULY 19, 1918.

1,440,575

INVENTOR
Leonidas E. Anderson
By Kay Totten & Powell
Attorneys

Patented Jan. 2, 1923.

1,440,575

UNITED STATES PATENT OFFICE.

LEONIDAS E. ANDERSON, OF PITTSBURGH, PENNSYLVANIA.

CLUTCH.

Application filed July 19, 1918. Serial No. 245,667.

*To all whom it may concern:*

Be it known that I, LEONIDAS E. ANDERSON, a citizen of the United States, and resident of Pittsburgh, in the county of Allegheny and State of Pennsylvania, have invented a new and useful Improvement in Clutches; and I do hereby declare the following to be a full, clear, and exact description thereof.

My invention relates to an improvement in driving clutches for automobiles or other machines.

The object of my invention is to provide an improved clutch connecting the wheel of a power impelled vehicle with the axle or a driving member with a driven member in which the connection is made gradually and is not liable to "grab", and which permits the connection to slip under excessive load, whereby the stripping of gears is avoided and the sudden starts and jolts are obviated, thereby reducing the wear and tear on the parts.

To these ends my invention comprises the novel features hereinafter set forth and claimed.

Figure 1:
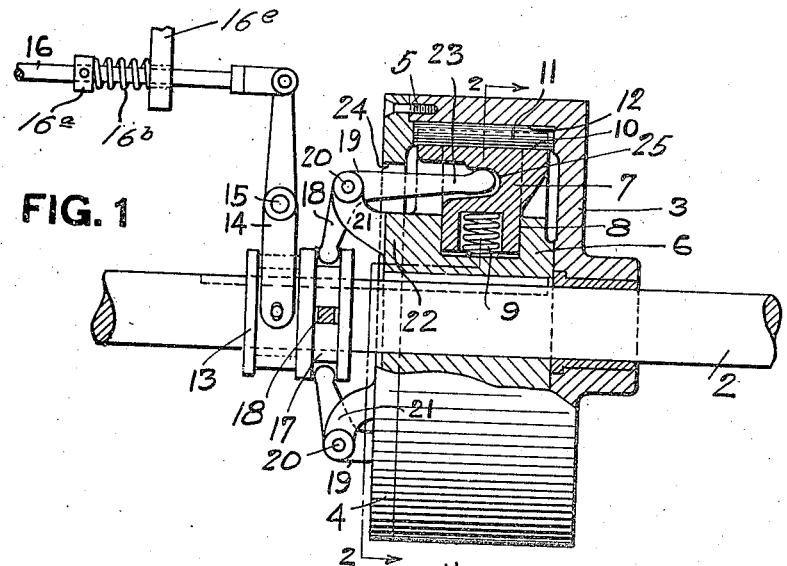
Figure 2:
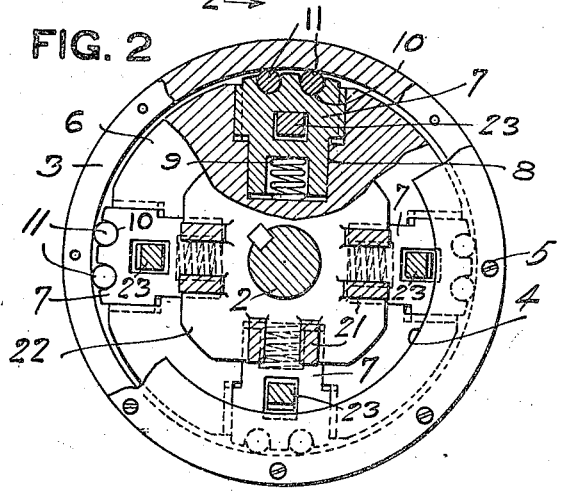

In the drawing Fig. 1 is a side view partly in elevation and partly in section of my improved clutch; Fig. 2 is a section on the line 2—2, Fig. 1.

In the drawing, the numeral 2 designates a power shaft on which is loosely mounted the pulley or fly-wheel 3. This pulley 3 is a hollow box-like member to which the face plate 4 is secured by screws 5.

Contained within the pulley 3 and keyed to the shaft 2 is the clutch-carrier 6. Mounted radially in said clutch carrier 6 are the clutch-members 7 fitting in seats 8 in said clutch-carrier by tongue and groove connection. Springs 9 are interposed between the inner ends of the seats 8 and the clutch-members 7 to normally force said members outwardly. Formed in the outer ends of the clutch-members 7 are the grooves 10 to receive the rollers 11, said grooves being deep enough to receive the greater part of said rollers, so that said rollers may rotate within said grooves with their exposed faces bearing against the inner wall 12 of the pulley 3. The grooves 10 are of a size to snugly hold the rollers 11 so that said rollers cannot have any traveling movement therein but simply a rotary movement. The springs 9 always hold the rollers 11 in contact with the inner wall of the pulley 3, but not in driving contact.

Mounted on the shaft 2 is the slidable collar 13 operated by the forked lever 14 pivoted at 15 and connected up to suitable operating means hereinafter more fully described. The collar 13 has the grooved portion 17 which receives the inner ends of the arms 18 of the bell-cranks 19 mounted at 20 on the lugs 21 extending out from the hub portion 22 of the clutch-carrier 6. The arms 23 of the bell-cranks 19 extend through an annular opening 24 in the face plate 4 of the pulley 3 and the inner ends of said arms enter seats or recesses 25 in the clutch-members 7. It will be apparent that by the movement of the lever 14 the bell-cranks will be operated to force the clutch members radially outward and bring the rollers 11 into driving frictional contact with the inner smooth face of the pulley 3.

Operating means for throwing the clutch into operation is provided whereby the friction elements are permitted to "slip" when the load exceeds a certain amount, and the degree of friction may be varied to suit the conditions. The object sought is mainly to prevent "grabbing" of the clutch when the shaft starts to rotate. To accomplish this result the lever 14 is connected to an operating rod 16, said rod having a collar $16^a$ fixed thereon and a spring $16^b$ is interposed between the collar and an abutment $16^c$. In operation, the spring normally acts through the bell crank and lever arrangement to hold the roller friction members in driving engagement with the pulley, the rod being free to move with movement of lever 14, and is locked against movement only when in disengaging position, a suitable quadrant or latch (not shown) being provided for locking the rod. In throwing in the clutch the rod is released and the spring $16^b$ forces the rod back, thus throwing the lever, and moving the clutch-members into driving engagement with the pulley. It will be apparent that the degree of friction between the rollers and pulley may be varied by moving the abutment with the spring $16^b$ between the abutment and the collar $16^a$.

The throwing of the clutch-members outwardly will impart a rotary movement to the pulley 3, and, due to the fact that the rollers 11 are resiliently mounted and can rotate in their seats and engage the smooth inner face of the pulley without traveling in said seats, a gradual movement of the pulley is obtained without quick or sudden starts, thereby doing away with the noise where gears are thrown into engagement, as well as the sudden jerks and jolts due to such sudden engagement. The wear and tear on the parts is largely obviated.

What I claim is:

In a friction clutch, the combination of a power-driven shaft, a pulley member loosely mounted thereon having an inner curved smooth bearing face, a clutch carrier within said pulley keyed to said power shaft, radially movable clutch members resiliently mounted in said clutch carrier having circular grooves formed therein, cylindrical rollers fitting in said grooves and adapted to rotate therein, and resilient means for moving said members radially to bring said rollers into frictional driving engagement with the smooth bearing face of said pulley.

In testimony whereof, I, the said LEONIDAS E. ANDERSON, have hereunto set my hand.

LEONIDAS E. ANDERSON.

Witnesses:
ROBT. D. TOTTEN,
JOHN F. WILL.